United States Patent [19]

Walters et al.

[11] Patent Number: 4,824,883

[45] Date of Patent: Apr. 25, 1989

[54] POLYOLEFIN COMPOUNDS HAVING IMPROVED HEAT CURING STABILITY, METHOD OF IMPROVING HEAT AGING STABILITY THEREIN, AN ELECTRICAL CONDUCTOR INSULATED THEREWITH AND METHOD OF FORMING

[75] Inventors: Robert B. Walters, Oxford; Edward V. Wilkus, Trumbull, both of Conn.

[73] Assignee: Vulkor, Incorporated, Lowell, Mass.

[21] Appl. No.: 147,028

[22] Filed: Jan. 19, 1988

Related U.S. Application Data

[63] Continuation of Ser. No. 576,163, Jan. 30, 1984, abandoned, which is a continuation of Ser. No. 474,240, Mar. 11, 1983, abandoned, which is a continuation-in-part of Ser. No. 965,716, Dec. 1, 1978, abandoned.

[51] Int. Cl.$^4$ ................................................ C08K 5/34
[52] U.S. Cl. ...................................... 524/93; 524/350; 524/351; 174/110 R; 174/110 SR
[58] Field of Search ....... 524/93; 174/110 R, 110 SR, 174/110 PM

[56] References Cited

U.S. PATENT DOCUMENTS

3,819,410   6/1974   Kuckro et al. ..................... 524/291
4,125,509  11/1978   Vostovich et al. ............. 174/110 PM

FOREIGN PATENT DOCUMENTS

52-76355   6/1977   Japan .

OTHER PUBLICATIONS

Gerald Scott: "Antioxidants", Chemistry and Industry, pp. 271–281 (Feb. 16, 1963).

*Primary Examiner*—Veronica P. Hoke
*Attorney, Agent, or Firm*—Hedman, Gibson, Costigan & Hoare

[57] ABSTRACT

Polyolefin compounds having improved resistance to oxidation and heat aging attributable to the incorporation therein of the combination of a zinc salt of a mercaptoimidazole with a sterically hindered phenol, a method of enhancing oxidation resistance and heat aging stability by means of the incorporation of the combination in polyolefins, an electrical conductor insulated therewith and method of forming.

14 Claims, No Drawings

POLYOLEFIN COMPOUNDS HAVING IMPROVED HEAT CURING STABILITY, METHOD OF IMPROVING HEAT AGING STABILITY THEREIN, AN ELECTRICAL CONDUCTOR INSULATED THEREWITH AND METHOD OF FORMING

This application is a continuation of Ser. No. 576,163 filed Jan. 30, 1984, which in turn is a continuation of application Ser. No. 474,240 filed Mar. 11, 1983 which in turn is a continuation-in-part of application Ser. No. 965,716 filed Dec. 1, 1978, all now abandoned.

BACKGROUND OF THE INVENTION

The degrading effects upon the original physical state and integrity of many polymeric compositions, such as polyolefins, attributable to oxidation, and particularly under the accelerating effects of heat, are well known disabling conditions or shortcomings of such materials when used in services or products wherein long term performance is desired or required. For instance, to be economical and practical, polymeric insulations used for electrical conductors such as building wire, electrical motor or machinery power wires, or underground power transmitting cables, must be enduring and must substantially retain their initial physical properties for effective and safe performance over long terms of many years of service.

Moreover, as is also well known, elevated temperatures, a condition commonly encountered in many electrical devices or operations associated therewith, greatly accelerate the rate of oxidation degradation in polymeric compositions. Thus, the problem of oxidation is commonly referred to as "heat aging" wherein the oxidizing reaction upon the polymer material is quickened or intensified by increased temperature conditions.

The debilitating oxidation deterioration of polymeric compositions, such as physical embrittlement and cracking, is a subject of vast and intensive concern and remedial efforts in the polymer art and industry as is evident from the extensive amount of patent and other technical literature directed to this problem of oxidation or heat aging. For example, U.S. Pat. Nos. 3,819,410 and 3,979,180 deal with the problem of polymer oxidation and provide brief summaries of the state of the art and prior proposed solutions thereo, including the citation of a number of relevant U.S. patents and their disclosed methods and techniques for resolving the same. Additional relevant patent literature comprises U.S. Pat. Nos. 3,296,189; 3,647,749; 3,717,610; 3,839,279; 3,886,114, 3,904,705; 4,018,808 and 4,029,332.

As is evident from the prior art, and in particular the disclosures of the above patents, a substantial number of diverse and highly complex organic compositions, commonly referred to as antioxidants, have been found to have some degree of stabilizing effect or retarding action upon the deteriorating oxidation of polymers, and therefore have been widely used to deal with this aspect of polymers. Additionally, it has been discovered that various combinations of such old antioxidant agents or additives provide unusually enhanced or synergistically increased stabilizing effects or inhibiting action in certain polymers.

SUMMARY OF THE INVENTION

This invention comprises the discovery of a new and improved antioxidant system for curable and cured polyolefin polymers and compounds thereof, comprising the combination of a zinc slt of a mercaptoimidazole with a sterically hindered di-tertiary butyl phenol, a method of stabilizing such polymers against oxidation and heat aging, electrical conditions insulated with cured polyolefins resistant to oxidation and stabilized against heat aging and methods of forming same.

OBJECTS OF THE INVENTION

A primary object of this invention is to provide improved and lasting resistance to oxidation, or stabilized heat aging, in polyolefin polymers or compounds thereof, and products comprising the same including cable products.

A further object of this invention is to provide an antioxidant or oxidation inhibiting system which is highly effective for stabilizing heat aging in polyolefins and inhibiting oxidation therein over a wide range of temperature conditions and for greatly extended periods.

A still further object of this invention is to provide an effective means of inhibiting oxidation or stabilizing heat aging in peroxide crosslink cured polyolefins wherein the antioxidant or stabilizing additives or agents do not distill off or otherwise become lost during the crosslink cure with heat or exposure to high temperatures.

Another object of this invention is to provide more effective and lasting antioxidant or stabilizing additives or agents which do not bleed from the polymer or are non-blooming, and do not adversely affect the base polymer or its properties.

It is also an object of this invention to provide antioxidant or stabilizing additives or agents which are compatible with conventional flame retarding systems comprising halogen-containing hydrocarbons with antimony oxide in polyolefin polymers.

It is additionally an object of this invention to provide long service-life electrical conductors having cured polyolefin insulations of improved and lasting heat aging stability or resistance to oxidation and to provide a method of forming such conductors.

BRIEF DESCRIPTION OF THE DRAWING

The drawing comprises a perspective view illustrating an insulated electrical conductor product embodying and produced according to this invention and produced by the method of the invention.

DESCRIPTION OF A PREFERRED EMBODIMENT

In accordance with this invention, a high level of lasting resistance to oxidation, or heat aging stability, is achieved in cured polyolefin polymers, or compounds thereof and electrical insulations produced therewith, among other improved and advantageous attributes, by incorporating in such polyolefins the combination of a sterically hindered di-tertiary butyl phenol with a zinc salt of mercaptoimidazole, and preferably zinc stearate.

The polyolefins of this invention comprise ethylene-containing polymers, including homopolymers such as polyethylene, copolymers of ethylene and other polymerizable materials, and blends of such polymers including copolymers. Typical copolymers of ethylene include, for example, ethylene-propylene copolymers and ethylene-propylene-diene terpolymers, ethylene-vinyl acetate, ethylene-ethyl acrylate and ethylene-methyl acrylate.

The polyolefins, or compounds thereof, of this invention can additionally comprise fillers, pigments, curing co-agents, fire retardants, and other conventional additives including preservatives such as supplementary antioxidants, modifying agents such as plasticizers, mold releasing ingredients or lubricants and the like which are commonly compounded with polyolefins or typical products thereof such as, for example, electrical insulations.

This invention also specifically applies to and includes all of the above-referenced polyolefin polymers in a crosslink cured and thermoset state, when the cure is effected by means of radiation or a chemical curing agent comprising a heat-activatable organic peroxide crosslinking agent such as disclosed in U.S. Pat. Nos. 2,888,424; 3,079,370; 3,086,966; and 3,214,422. Suitable peroxide crosslink curing agents comprise organic tertiary peroxides characterized by at least one unit of the structure:

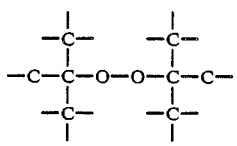

which decomposes at a temperature above about 146° C. (295° F.) and thereby provide free radicals. Preferred peroxide for curing polyolefins is di-α-cumyl peroxide; and other apt peroxides comprise the tertiary diperoxides such as 2,5-dimethyl-2,5-di(t-butyl peroxy) hexane) hexyne-3, and the like diperoxy and polyperoxide compounds.

The sterically hindered phenols for use in this invention, in combination with the zinc salt of a mercaptoimidazole, consist of conventional sterically hindered di-tertiary butyl mono and poly 2,6-di-t-butyl phenols. Preferred hindered phenol antioxidants for use in the practice of this invention comprise: Tetra kis [methylene-3(3',5'-di-tert-butyl-4'-hydroxy phenyl)propionate]methane, sold under the trade designation Irganox 1010 by Ciba-Geigy; thioester bis hindered phenol, sold under the trade designation Irganox 1035 by Ciba-Geigy; octadecyl 3-(3',5'-di-tert-butyl-4'-hydroxy phenyl)propionate, sold under the trade designation Irganox 1076 by Ciba-Geigy and, 1,3,4-trimethyl-2,4,6-tris (3',5'-di-tert-butyl-4'-hydroxy phenyl) benzene, sold under the trade designation Antioxidant 330 by Ethyl Corp. Other hindered phenol antioxidants are listed in U.S. Pat. No. 3,979,180.

The zinc salt of a mercaptoimidazole component of the combination of this invention comprises a zinc salt of a 2-mercaptobenzimidazole sold under the trade designation Vulkanox ZMB by Mobay Chemical, or a zinc salt of 2-mercaptotolylimidazole sold under the trade designation Vanox ZMTI by R. T. Vanderbilt or Vulkanox ZMB-2 by Mobay Chem.

The combination of a zinc salt of a mercaptimidazole with a sterically hindered di-tertiary butyl phenol antioxidants of this invention can be mixed and combined with a polyolefin material or compound thereof, by means of any conventional compounding method or apparatus, such as working in a Banbury mixer or on a two roll rubber mill. Preferably all ingredients of the compound formulation, except those which are sensitive to the relatively moderate mixing temperatures of about 150° C. (300°F.) to about 205° C. (400°F.), such as a heat decomposable organic peroxide curing agent, are combined and initially admixed together at a temperature sufficient to often and plasticize the particular polyolefin polymer ingredients. Following the attainment of a substantial uniformity of the initially admixed ingredients, the temperature of the admixed batch is reduced below the decomposition level of the particular peroxide curing agent used, or other heat sensitive ingredients to be added, and the curing agent or other heat sensitive ingredients are then introduced and dispersed preferably uniformly throughout the mix.

The proportions of the antioxidant ingredients of the novel stabilizing combination of this invention added to the polyolefin compounds can be varied and depends primarily upon the level of heat aging stability or oxidation inhibition desired or required in the cured polymer material or product thereof. However, with the higher degree or levels of heat aging stability or oxidation inhibition provided by the novel combination of this invention comprising the essential sterically hindered phenol with a zinc salt of a mercaptoimidazole, typical amounts of the essential combination comprise about 1 to about 6 parts by weight of the hindered phenol per 100 parts by weight of the polyolefin polymer, and about 1 to about 12 parts by weight of the zinc salt of a mercaptoimidazole per 100 parts by weight of the polyolefin polymer. In a preferred embodiment, both components of the novel combination of essential ingredients which are responsible for the improved and lasting heat againg, stability or inhibited oxidation, are included or added in the polymer in a ratio to each other of approximately 1 part of the hindered phenol per 2 to 4 parts of the zinc salt of a mercaptoimidazole by weight, for example about 4 to 8 parts by weight of the zinc salt of a mercaptoimidazole with about 2 to 4 parts by weight of the hindered phenol per 100 parts by weight of the polymer generally provides optimum heat aging stability. Although greater amounts of the agents can be used, the benefits derived from such larger amounts thereof are generally not proportional thereto.

Additionally, ancillary or supplemental antioxidants can be included in the overall polyolefin compounds in conventional amounts in addition to the particular novel and essential combination of this invention.

The zinc stearate of the preferred embodiment of this invention is included in amounts of up to about 6 parts by weight based on 100 parts by weight of the polymer. For example, about 1 to about 6 parts by weight thereof.

As noted hereinbefore regarding the heat aging stabilizing systems of this invention, the antioxidant combination is compatible with many flame retarding systems and can be included with conventional flame retardants in polyolefin compounds. Such typical flame retarding systems comprise halogen-containing organic compounds or materials which are used with antimony compounds or their equivalents, including the halogenated hydrocarbons of U.S. Pat. No. 2,480,298. For example, conventional halogenated hydrocarbons for flame resistance comprise chlorinated paraffin, chlorinated propanes, chlorinated propylenes, hexachloroethane, chlorinated polythene, chlorinated polyisobutylene, polyvinyl chloride, polyvinylidene chloride, afterchlorinated polyvinyl chloride, chlorinated polyphenyls, chlorinated naphthalenes, hexachlorobenzene, chlorinated idenes, chlorinated polystyrenes, chlorinated diphenyl alkanes, chlorinated polyphenyl ethers, and their brominated or other halogenated equivalents, such as halogenated alkanes, aromatics, polyaromatics and hetrocyclics. Also included as conventional halogenated hydrocarbons are proprietary halogenated flame retardants such as Hooker Chemical Company's Dechlorane Plus 25 or Plus 515, Diamond Alkali Company's Chlorowax, and similar products. Dechlorane Plus 25 is the condensation product of 2 moles of hexachlorocyclopentadiene with 1 mole of cyclooctadiene.

Halogen-containing flame retardants can be included in substantial amounts of up to about 70 parts by weight per 100 parts by weight of the polyolefin polymer, and preferably also included in an antimony oxide compound which can be present in amounts of up to about 35 parts by weight per 100 parts by weight of the polyolefin polymer.

The following examples and data derived therefrom demonstrate the improved effects of the novel combinations of this invention in typical crosslink cured polyolefin compounds formulated for use as an electrical insulation with respect to the same polymer compositions as standards, including single antioxidants of the same compositions or different combinations of other conventional antioxidants, or other variations in the components. The polymeric insulating composition formultions of the standards and of the examples of this invention are all given in relative parts by weight, and the compositions of the standards and of the invention in each evaluation or series of tests were all prepared, cured and tested under identical conditions.

The following comparative evaluations demonstrate the pronounced and significant synergistic effect upon heat aging in polyolefin compounds attributable to the antioxidant system of this invention, comprising the unqiue combination of the sterically hindered phenol with a zinc salt of a mercaptoimidazole in relation to the same antioxidants used alone as standards. In the tests applied to the compositions comprising the standards and examples of the invention, the original physical properties and hot modulus determinations thereof provide a measure of the state or degree of cure of the polymer compositions. The heat aging test was carried out at a relatively high and debilitating temperature level of 180° C. in a air oven for accelerated heat aging with measurement of tensile and elongation made at 7 day, 14 day and 21 day periods of exposure to such temperature and reported as percent retention of original tensile and elongation. The compositions of the standards and examples of the invention were all press cured for 20 minutes at 350° F. The ingredients of the compositions of the standards and of the invention, and their properties elevant to heat aging are given in the following Table I.

TABLE I

| | STANDARDS | | | EXAMPLES | |
|---|---|---|---|---|---|
| | A | B | C | I | II |
| COMPONENTS, PARTS BY WEIGHT | | | | | |
| Polyethylene-Ethylene vinyl acetate copolymer (72% polyethylene - 18% ethylene vinyl acetate) (Alathon 3170 du Pont) | 100 | 100 | 100 | 100 | 100 |
| Zinc salt of 2-mercaptobenzimidazole (Vulkanox ZMB Mobay) | — | 6 | — | 4 | — |
| Tetra Kis [methylene-3(3',5'-di-tert-butyl-4'-hydroxy phenyl) propionate] methane (Irganox 1010 - Ciba-Geigy) | — | — | 6 | 2 | 2 |
| Zinc stearate | — | — | — | — | 2 |
| Curing coagent (SR-350 Sartomer Co.) Trimethylol propane tri methacrylate | 4 | 4 | 4 | 4 | 4 |
| Dicumyl peroxide curing agent (Dicup-R - Hercules) | 2.5 | 2.5 | 2.5 | 2.5 | 2.5 |
| PROPERTIES | | | | | |
| Original Tensile, psi | 2258 | 2912 | 2568 | 3515 | 4023 |
| Original Elongation, percent | 326 | 430 | 438 | 497 | 524 |
| Hot Modulus, psi | 90@40% | 106@75% | 79@70% | 82@100% | 109@7.3 |
| Toluene Extraction, percent | 3.5 | 14.4 | 14.2 | 13.3 | 10.6 |
| 7 Days - 180° C. | | | | | |
| Percent Retention, Tensile | 17 | 120 | 75 | 102 | 105 |
| Percent Retention, Elongation | 4 | 104 | 72 | 101 | 95 |
| 14 Days - 180° C. | | | | | |
| Percent Retention, Tensile | 12 | 36 | 28 | 108 | 85 |
| Percent Retention, Elongation | 1 | 21 | 11 | 92 | 77 |
| 21 Days - 180° C. | | | | | |
| Percent Retention, Tensile | 12 | 32 | 22 | 41 | 71 |
| Percent Retention, Elongation | 0 | 4 | 3 | 46 | 59 |

As is apparent from the data, the composition of Example 1 including the antioxidant system of a combination of this invention retained 45% of elongation after 21 days at 180° C., compared to the less than 5% elongation retention of the composition of the standards with a like quantity of either antioxidant alone. The added inclusion of zinc stearate in the system in Example II enhances both the extent of the cure and the effect of the antioxidant system of this invention to provide a further improvement in both the original and heat aged physical properties as evidenced by the lower toluene extraction and higher hot modulus.

The base polymeric composition or compound used for the samples of both the standards and examples of the invention in all following comparative evaluations consists of the formulation set forth below in parts by weight based upon 100 parts by weight of the polymer content. The basic composition formulation included a commercial flame retardant, Dechlorane Plus 25, and antimony oxide to provide a typical flame resisting system. This basic composition formulation providing the Standard, was modified as indicated in each instance in the Tables.

| INGREDIENT | PARTS BY WEIGHT |
|---|---|
| Polyethylene-ethylene vinyl acetate copolymer (72% polyethylene - 18% EVA copolymer) (Alathon 3170 - du Pont) | 100 |
| Tetra Kis [methylene-3(3',5'-di-tert-butyl-4'-hydroxy phenyl) propionate] methane (Irganox 1010 - Ciba Geigy) | 2 |
| Zinc salt of 2-mercaptoimidazole (Vulkanox ZMB - Mobay Chemical) | 4 |
| Zinc stearate | 2 |
| Condensation product of 2 moles hexachlorocyclopentadiene and 1 mole of cyclooctadiene (Dechlorane Plus 25 - Hooker Chemical) | 35 |
| Antimony oxide | 17.5 |
| Trimethyl propane tri methacrylate curing coagent (SR-350 - Sartomer Co.) | 4 |
| Dicumyl peroxide crosslink curing agent (Di Cup - Hercules) | 2.5 |

The following evaluations of the effects upon heat aging in a polyolefin compound attributable to combinations of various antioxidants or types thereof demonstrates the selectivity and distinctiveness of the particular combinations of the antioxidant system of this invention. Tables II and III demonstrate the relative resistance to heat aging provided by several different combinations of similar and unlike types of antioxidants, comprising the combinations of antioxidants of this invention and combinations of antioxidants outside of the invention. Table II tests and demonstrates the effects of the use of several different imidazole or thiazole antioxidants combined with a sterically hindered phenol (Irganox 1010) antioxidant as a substitute for the Vulkanox ZMB of Examples I and II, included therewith in the equivalent molar basis as the 4 parts by weight of the Vulkanox ZMB per 100 parts by weight of the polymer, and combined with the 2 parts by weight of the sterically hindered phenol antioxidant Irganox 1010. Table III alternatively tests and demonstrates the effects of the use of several phenolic types of antioxidants combined with a zinc salt of a mercaptoimidazole (Vulkanox ZMB) antioxidant as a substitute for the Irganox 1010 of Examples I and II, included therein in the equivalent molar basis as the 2 parts by eight of the Irganox 1010 per 100 parts by weight of the polymer, and combined with 4 parts by weight of the zinc salt of mercaptoimidazole Vulkanox ZMB.

TABLE II

| Sample | Irganox 1010* Plus Antioxidant Agent Of: | Parts By Weight | Original Physicals Tensile | Original Physicals Elong. | Hot Modulus | 21 Days - 180° C. Air Oven Aging Percent Retention Tensile | 21 Days - 180° C. Air Oven Aging Percent Retention Elong. |
|---|---|---|---|---|---|---|---|
| Standard | Zinc salt of 2-mercaptobenzimidazole (Vulkanox ZMB) (Mobay) | 4.0 | 2967 | 473 | 81 | 32 | 30 |
| 1 | Zinc salt of 2-mercaptotolylimidazole (Vanox ZMTI) (R. T. Vanderbilt) | 4.37 | 3037 | 488 | 63 | 36 | 39 |
| 2 | 2-mercaptobenzimidazole (Vulkanox MB) (Mobay) | 1.98 | 2923 | 503 | 57 | 21 | 3 |
| 3 | 2-mercaptotolylimidazole (Vanox MTI) (R. T. Vanderbilt) | 2.17 | 2875 | 498 | 74 | 20 | 2 |
| 4 | 2-mercaptobenzothiozole (Captax) (R. T. Vanderbilt) | 2.20 | 1925 | 520 | 12 | 28 | 1 |
| 5 | Zinc salt of 2-mercaptobenzothiozole (ZMBT Waxed) | 5.24 | 2531 | 467 | 44 | 32 | 6 |

*Irganox 1010 - Tetra kis [methylene-3(3',5'-di-tert-butyl-4'-hydroxy phenyl) propionate] methane As is apparent from the data of Table II, only the zinc salts of the mercaptoimidazoles, when combined with the sterically hindered di-tertiary butyl phenol antioxidant, produce a pronounced synergistic effect in controlling heat aging, and only the imidazoles provided effective protective characteristics for high temperature service.

TABLE III

| Sample | Vulkanox ZMB* Plus Antioxidant Agent Of: | Parts By Weight | Original Physicals Tensile | Original Physicals Elong. | Hot Modulus | 21 Days - 180° C. Air Oven Aging Percent Retention Tensile | 21 Days - 180° C. Air Oven Aging Percent Retention Elong. |
|---|---|---|---|---|---|---|---|
| Standard | Tetra kis [methylene-3(3',5'-di-tert-butyl-4'-hydroxy phenyl) propionate] methane (Irganox 1010) (Cibi-Geigy) | 2.0 | 2967 | 473 | 81 | 32 | 30 |
| 1 | Bis(4-t-butyl-3 hydroxy-2,6-benzyl) dithioterephthalate (Cyanox 1729) (Amer. Cyanamid) | 1.84 | 2217 | 430 | 53 | 32 | 8 |
| 2 | Octadecyl 3-(3',5'-di-tert-butyl-4'-hydroxy phenyl) propionate (Irganox 1076) (Cibi-Geigy) | 3.61 | 2609 | 501 | 41 | 39 | 37 |
| 3 | Thioester bis hindered phenol (Irganox 1035) (Cibi-Geigy) | 2.18 | 2931 | 497 | 57 | 35 | 35 |
| 4 | (Mark 1589) (Argus Chemical Corp.) | 2.04 | 2678 | 460 | 86 | 53 | 59 |
| 5 | 4,4'-thio bis (3-methyl-6-tert-butyl phenol) (Santonox R) (Monsanto) | 1.22 | 2695 | 485 | 57 | 28 | 16 |
| 6 | 4,4'-thio bis-(6-tert- | 1.22 | 2584 | 485 | 62 | 29 | 1 |

TABLE III-continued

| Sample | Vulkanox ZMB* Plus Antioxidant Agent Of: | Parts By Weight | Original Physicals Tensile | Elong. | Hot Modulus | 21 Days - 180° C. Air Oven Aging Percent Retention Tensile | Elong. |
| --- | --- | --- | --- | --- | --- | --- | --- |
| 7 | butyl-m-cresol)(Santowhite Crystals) - Monsanto (CAO-44) Ashland Chemical Company | 1.22 | 2597 | 482 | 56 | 27 | 5 |
| 8 | (Goodrich TTT) B. F. Goodrich | 2.20 | 2445 | 454 | 106 | 38 | 17 |
| 9 | 1,1,3-trio(2'-methyl-4'-hydroxy-5'-tert-butyl phenyl) butane (Topanol CA) ICI United States, Inc. | 1.23 | 2923 | 484 | 72 | 26 | 10 |

*Vulkanox ZMB — zinc salt of 2-mercaptobenzimidazole

The data of Table III demonstrates that only the sterically hindered di-tertiary butyl phenols, when combined with the zinc salts of the mercaptoimidazole antioxidants, produce a pronounced synergistic effect in controlling heat aging and permanence.

The following Table IV illustrates the practice of this invention of the combination of a zinc salt of a mercaptoimidazole with a sterically hindered phenol as set forth in the above base polymer composition formulation, with several different polyolefin polymer materials in place of the Alathon 3170 polymer as the standard.

TABLE IV

| Sample | Polymer | % EVA | Original Physicals Tensile | Elong. | Hot Modulus | Deformation Resistance @180° C. % | 21 Days - 180° C. Air Oven Aging Percent Retention Tensile | Elong. |
| --- | --- | --- | --- | --- | --- | --- | --- |
| Standard | Alathon 3170 (du Pont) | 18 | 2857 | 488 | 60 | 24.6 | 44 | 40 |
| 1 | Alathon 3130 (du Pont) | 12 | 2721 | 444 | 58 | 17.2 | 45 | 43 |
| 2 | DQD - 1868 (Union Carbide) | 18 | 2759 | 460 | 60 | 18.4 | 58 | 52 |
| 3 | UE - 632 (U.S. Industries) | 14 | 2525 | 448 | 58 | 23.8 | 34 | 15 |
| 4 | UE - 637 (U.S. Industries) | 9 | 2694 | 437 | 67 | 19.8 | 44 | 26 |
| 5 | UE - 635 (U.S. Industries) | 9 | 2181 | 433 | 55 | 26.9 | 52 | 31 |
| 6 | EH - 497 (Cities Service) (polyethylene) | 0 | 2670 | 434 | 112 | 14.0 | 51 | 28 |

As is evident from the data, the polyolefin composition of this invention, containing the combination of the specified sterically hindered phenol with a zinc salt of a mercaptoimidazole is significantly more stable than those containing combinations of similar antioxidants.

The cured, heat aging stabilized or oxidation resistant polyolefin polymer, or compounds thereof, of this invention are particularly useful materials for dielectric insulation for electrical conductors such as wire and cable. A typical insulated electrical conductor product of this invention is illustrated in the drawing. Referring to the drawing, an insulated product 10 comprising a metallic conductor 12, composed of a single strand as shown, or a bundle of individual strands, having an overlying electrically insulating covering 14 of a polymeric composition according to the present invention and which is highly resistant to oxidation and stabilized against heat aging.

Further, the present invention includes the distinct and novel methods by which products such as those described immediately above are prepared.

Among the novel methods of the present invention are the following:

A. A method of producing an electrical conductor insulated with a cured polyolefin compound having improved and lasting heat aging stability, comprising combining with an organic peroxide crosslink curable polyolefin polymer the combination of a sterically hindered ditertiary butyl phenol in an amount of about 1 to about 6 parts by weight per 100 parts by weight of the polyolefin polymer and at least one zinc salt of a mercaptoimidazole selected from the group consisting of a zinc salt of 2-mercaptobenzimidazole and a zinc salt of 2-mercaptototolylimidazole in an amount of about 2 to about 12 parts by weight per 100 parts by weight of the polyolefin polymer, applying the curable polyolefin polymer combined with said combination to an electrical conductor, and crosslink curing the curable polyolefin polymer with an organic peroxide crosslink curing agent.

B. A method of producing an electrical conductor insulated with a cured ethylene-containing polymer compound having improved and lasting heat aging stability, comprising combining with an organic peroxide crosslink curable ethylene-containing polymer selected from the group consisting of polyethylene, copolymers of ethylene and other polymerizable materials, and blends of polyethylene and other polymers, and mixtures thereof, the combination of a sterically hindered di-tertary butyl phenol in an amount of about 1 to about 6 parts by weight per 100 parts by weight of the ethylene-containing polymer and at least one zinc salt of a mercaptoimidazole selected from the group consisting of zinc salt of 2-mercaptobenzimidazole and a zinc salt of 2-mercaptotolylimidazole in an amount of about 2 to about 12 parts by weight per 100 parts by weight of the ethylene-containing polymer, applying the curable ethylene-containing polymer combined with said combination to an electrical conductor, and crosslink curing the curable ethylene-containing polymer with an organic peroxide crosslink curing agent.

C. A method of producing an electrical conductor insulated with a cured ethylene-containing polymer having improved and lasting heat aging stability, comprising combining, in approximate relative parts by weight, the ingredients of:
Ethylene-containing polymer: 100.0
Sterically hindered di-tertiary butyl phenyl: 1–6
At least one zinc salt of a mercaptoimidazole selected from the group consisting of 2-mercaptobenzimidazole and 2-mercaptotolylimidazole: 2–12
Zinc stearate: 1–6
Halogen-containing organic compound: 0–70
Antimony oxide: 0–35
Peroxide crosslink curing agent: 2–6
applying the crosslink curable polyethylene combined with said ingredients to an electrical conductor, and crosslink curing the curable ethylene-containing polymer.

Although the invention has been described with reference to certain specific embodiments thereof, numerous modifications are possible and it is desired to cover all modifications falling within the spirit and scope of this invention.

What we claim as new and desire to secure by Letters Patent of the United States is:

1. A polyolefin polymer composition which may be cured by cross-linking with an organic peroxide curing agent comprising a polyolefin polymer and from about 1 to 6 parts by weight per 100 parts by weight of said polyolefin polymer of a sterically hindered di-tertiary butyl phenol and from about 1 to about 12 parts by weight of said polyolefin polymer of at least one zinc salt of mercaptoimidazole selected from the group consisting of a zinc salt of 2-mercaptobenzimidazole, a zinc salt of 2-mercaptotolylimidazole and mixtures thereof.

2. The polyolefin polymer of claim 1 wherein said phenol is present in a ratio of about 1 part by weight to every about 2 to about 4 parts by weight of the zinc salt.

3. The polyolefin polymer of claim 1 which contains a flame retardant composition.

4. The polymer of claim 3 wherein said flame retardant composition is a combination of a halogen-containing organic compound and an oxide of antimony.

5. The cured cross-linked polymer of claim 1.

6. The polyolefin polymer of claim 1 com;prising at least one ethylene-containing polymer selected from the group consisting of polyethylene, copolymers of ethylene and other polymerizable materials and blends of polyethylene and other polymers.

7. The cured cross-linked polymer of claim 6.

8. The polyolefin polymer of claim 1 containing from about 1 to about 6 parts by weight of zinc stearate per 100 parts by weight of polymer.

9. The cured cross-linked polymer of claim 8.

10. The polyolefin polymer of claim 1 having an improved heat-aging property comprising by weight the relative amounts of the following materials:
  (a) ethylene containing polymer: Parts 100
  (b) sterically hindered di-tertiary butyl phenol: 1–2
  (c) said at least one zinc salt: 1–12
  (d) zinc stearate: 1–6
  (e) halogen-containing organic compound: 0–70
  (f) antimony oxide: 0–35
  (g) organic peroxide curing agent: 2–6.

11. A polyolefin polymer composition which may be cured by cross-linking with an organic peroxide curing agent comprising a polyolefin polymer, a sterically hindered di-tertiary butyl phenol and at least one zinc salt selected from the group consisting of the zinc salt of 2-mercaptobenzimidazole, the zinc salt of 2-mercaptotolylimidazole and mixtures thereof.

12. A polyolefin polymer composition as defined in claim 2 wherein the ratio of the zinc salt to the sterically hindered di-tertiary butyl phenol is about 2 to 4 parts by weight of the zinc salt to one part by weight of the sterically hindered di-tertiary butyl phenol by weight.

13. A polyolefin polymer composition as defined in claim 12 wherein the composition includes 4 parts by weight of zinc-2-mercaptobenzimidazole and 2 parts by weight of tetrakis(methylene-3(3'-5'-di-tert-butyl-4'-hydroxy phenyl)propionate)methane per 100 parts by weight of polyolefin polymer.

14. A method of improving and prolonging the heat aging stability of cured polyolefin polymer compounds, comprising combining with a curable polyolefin polymer the combination of a sterically hindered di-tertiary butyl phenol in an amount of about 1 to about 6 parts by weight per 100 parts by weight of the polyolefin polymer and at least one zinc salt of a mercaptoimidazole selected from the group consisting of a zinc salt of 2-mercaptobenzimidazole and a zinc salt of 2-mercaptotolylimidazole in an amount of about 1 to about 12 parts by weight per 100 parts by weight of the polyolefin polymer, and cross-linking the polymer with an organic peroxides curing agent.

* * * * *